United States Patent
Sveinsbo et al.

(10) Patent No.: US 10,035,722 B2
(45) Date of Patent: Jul. 31, 2018

(54) APPARATUS AND METHOD FOR PRODUCTION OF FOAMED GLASS AND A FOAMED GLASS MATERIAL

(71) Applicant: Glassolite Ltd., Windsor (GB)

(72) Inventors: Gunnar Sveinsbo, Godvik (NO); Finn Erik Solvang, Tonsberg (NO)

(73) Assignee: Glassolite Ltd, Windsor (GB)

( * ) Notice: Subject to any disclaimer, the term of this patent is extended or adjusted under 35 U.S.C. 154(b) by 15 days.

(21) Appl. No.: 15/308,617

(22) PCT Filed: May 4, 2015

(86) PCT No.: PCT/EP2015/059719
§ 371 (c)(1),
(2) Date: Nov. 3, 2016

(87) PCT Pub. No.: WO2015/169749
PCT Pub. Date: Nov. 12, 2015

(65) Prior Publication Data
US 2017/0174548 A1    Jun. 22, 2017

Related U.S. Application Data

(60) Provisional application No. 61/988,335, filed on May 5, 2014.

(51) Int. Cl.
*C03B 19/08* (2006.01)
*C03C 11/00* (2006.01)

(52) U.S. Cl.
CPC ............ *C03B 19/08* (2013.01); *C03C 11/007* (2013.01)

(58) Field of Classification Search
CPC ....................................................... C03B 19/08
See application file for complete search history.

(56) References Cited

U.S. PATENT DOCUMENTS

| | | | |
|---|---|---|---|
| 2,191,658 A | * | 2/1940 | Haux ...................... C03B 19/08 264/51 |
| 2,255,237 A | | 9/1941 | Willis |
| 4,190,416 A | * | 2/1980 | North ...................... C03B 19/08 264/43 |
| 4,208,367 A | | 6/1980 | Wunning |

(Continued)

FOREIGN PATENT DOCUMENTS

WO    WO2011/087373 A    7/2011

*Primary Examiner* — Cynthia Szewczyk
(74) *Attorney, Agent, or Firm* — Christian D. Abel (57) ABSTRACT

An apparatus and method for producing foamed glass having a silo (1) for receiving a glass mixture containing a temperature-activated foaming agent, a sluice chamber (12) arranged to receive a volume of glass mixture from the silo, a feed chamber (22) arranged to receive a volume of glass mixture from the sluice chamber, an extruder chamber (26) arranged to receive a volume of glass mixture from the feed chamber where the glass is melted and the foaming agent is activated, one or more nozzles (32) arranged at an end of the extruder chamber, through which a viscous foamed glass material may exit under influence of a positive operating pressure and an expansion chamber (38) arranged to receive foamed glass mixture from the nozzles. The invention also includes a novel foamed glass product having a glassy, sealed outer surface and a unique internal cell structure.

10 Claims, 11 Drawing Sheets

(56) References Cited

U.S. PATENT DOCUMENTS

2003/0084683 A1    5/2003  Dejaiffe
2004/0202744 A1*  10/2004  Bacher ............... B29B 17/0036
                                                              425/207
2005/0019542 A1    1/2005  Hojaji

* cited by examiner

APPARATUS AND METHOD FOR PRODUCTION OF FOAMED GLASS AND A FOAMED GLASS MATERIAL

FIELD OF THE INVENTION

The invention relates to foamed glass, more particularly to an apparatus and method for producing various lightweight products of sealed, foamed glass, as well as a foamed glass material.

BACKGROUND

Foamed glass traditionally consists of crushed glass with an added reactive ingredient and one or more oxidants that are heated to a temperature of from 800-1000 degrees Celsius, depending on the choice of additives.

Traditionally, the production of foamed glass is carried out in an open process where the finished foamed glass is either crushed into the desired fraction size or cut into blocks or other desired profiles and elements. This means that in fractured and cut surfaces an open cell structure is produced that is capable of, inter alia, absorbing water. At the same time, many loose particles are formed as a part of this process.

Traditional production of foamed glass involves large generation of dust both in connection with pre-processing and finishing of the different products, and the process itself is highly energy-intensive as it takes place in a partly open process at atmospheric pressure.

The traditional method requires the admixture of ground glass powder and additives to be homogeneous before it is passed on for melting, in order to obtain a homogenous cell structure after all the gases have been formed.

SUMMARY OF THE INVENTION

The present invention comprises an apparatus and a method based on mixing a reactive ingredient with one or more oxidants in order to form an admixed foaming agent and then to add it to crushed or finely ground glass to form a glass mixture, before delivery into an extruder chamber that is under positive pressure. The mixture is heated under positive pressure in an extruder chamber to a temperature of between 900 and 1150 degrees Celsius. When the reaction process nears the end, the finished and compressed foamed glass is passed out via one or more nozzles into a heated zone of lower pressure where it is allowed to expand, this zone hereafter referred to as expansion chamber. The fact that the foamed glass is passed out through a nozzle under positive pressure means that the cells, on expansion, are uniformly distributed and keep their cell walls intact. This gives a closed cell structure which is both watertight and, to a large extent, gastight. Since the process is carried out under pressure and at a higher temperature than traditional foamed glass production, a lower viscosity of the melted glass is obtained together with an attendant improved distribution of gases in the glass melt. This means that the present invention can use a coarser fraction of the glass used as raw material than the prior art, and that the additives do not need to be absolutely homogeneously mixed for a homogenous cell structure to be obtained in the finished product. This gives substantial cost savings in connection with the purchase of raw materials. At the same time, a homogenous cell structure with sealed surface gives a greater compressive strength than traditional foamed glass.

The fact that the process takes place under positive pressure and in a closed extruder chamber results in a significant reduction of dust, whilst energy loss is reduced and better control of heat recovery is obtained. All told, this gives lower operating costs and lower energy costs.

According to an aspect of the invention, a liquid foamed glass is formed under positive pressure, which is used to make different types of products, of different shape, size, density and compressive strength. At the same time, the process results in the finished products having an almost glassy and watertight surface. According to an aspect of the invention, the foamed glass is cut up whilst it is still liquid or deposited into heated moulds, thereby preventing the formation of an open cell structure in fractured and cut surfaces. This makes the product more water-resistant and also reduces the formation of dust associated with the working of the finished product.

According to another aspect of the invention, foamed glass is passed under positive pressure out of the extruder chamber via different nozzles and onto a heated belt in the form of a sausage, in order then to cut these "sausages" up into different sizes, normally from 10-60 mm. Typical products here will be lightweight insulating materials for transport (road, rail, airports, bridge abutments), construction pits (compensated foundations, in-ground insulation and back-filling), sports installations (artificial grass pitches, shale pitches, rehabilitation of pitches, paths and tracks), and water and sewage (ditches for water mains, branch lines, long-distance heating).

An alternative to foamed glass "sausages" is to pass the foamed glass onto the conveyor belt via a wide nozzle in order then to lay down a sheet (curtain), which is later broken into desired fractions. See image 3 below. Open cells may be formed in fractured surfaces on these products.

According to another aspect of the invention, the method consists of passing foamed glass under positive pressure out via different nozzles into an externally heated expansion chamber of different shape, in order then to cut the glass up into different lengths, for example, pellets. These lightweight pellets will then be given a sealed surface on all edges, even in the cut surfaces. This makes the products highly water-resistant. The cutting mechanisms can utilise air under high pressure or a suitably hard heat-resistant material to cut the pellets.

According to another aspect of the invention, a tubular product of foamed glass is formed. The product is made via vacuum casting, die casting, pressure die casting or by using centrifugal force, to fill a heated mould with liquid foamed glass in order then to cast whole or half tubular elements. The hollow sections and tubular elements can then be assembled into a tubular product of foamed glass. The product is useful as fireproofing and/or thermal insulation for both offshore and onshore installations in the oil and gas industry. An advantage of the tubular product made by the present method is that the product will have a sealed surface on both the inside and the outside of the hollow sections and tubular elements. This gives an increased degree of water resistance, less friction against the pipe surfaces and high compression strength. At the same time, sealed foamed glass according to the invention is virtually chemically neutral with a significantly smaller risk of corrosion of the pipes than traditional foamed glass products for use in the oil and gas sector.

The production of foamed glass according to the invention can be carried out by a continuous delivery of raw materials that are surface-melted in the extruder chamber or as a batch-wise production where a suitable dose is added to the extruder chamber and melted at a desired temperature. Introduction into a mould will then also take place batch-wise, but based on the same casting principles.

All processing of the expanded foam takes place at temperatures of between 900 degrees and 1150 degrees Celsius. The finished products are subsequently cooled in accordance with an established cooling routine to remove tensions in the product and obtain desired cell size.

The fact that our method is based on relatively small closed production units means that these units can be mobile, unlike traditional production that takes place in large and partly open furnaces that are stationary.

Altogether, this gives lower investment costs per unit of foamed glass produced, and means that we can, if required, move production around to where the customer is. This may be relevant, inter alia, where there are large road projects that need lightweight materials for insulation of the roadway. All in all, this reduces the transport costs.

According to another aspect, the invention comprises a new material of foamed glass with unique cell structure, higher compression strength and a sealed, glassy surface

BRIEF DESCRIPTION OF THE DRAWINGS

The invention will now be described in more detail with reference to the attached drawings, wherein:

FIGS. 21a,b and c shows an example of a half cylinder mould in an upper and a lower position and from the top respectively.

DETAILED DESCRIPTION

The invention will now be described with reference to the drawings, which show the whole extrusion process without external connections.

Reference numeral 1 denotes a silo for receiving crushed glass with admixed foaming agent for further transport to a dosing chamber.

2 denotes a valve for inlet to silo.
2.1 denotes a controlled gate valve.
3 denotes a main chamber containing crushed glass with admixed foaming agent.
4 denotes a valve for inlet to dosing chamber.
4.1 denotes a gate valve.
5 denotes a temperature sensor/manometer.
5.1 denotes a level sensor.
6 denotes the dosing chamber.
7 denotes a valve for inlet to sluice chamber.
8 denotes a valve shaft for opening and closing.
9 denotes a control unit for air/gas.
9.1 denotes a pressure sensor/manometer.
10 denotes inlet/outlet positive pressure pre-heated air/gas.
11 denotes a temperature sensor/manometer.
12 denotes a sluice chamber.
13 denotes a valve for outlet from the sluice chamber.
14 denotes a valve shaft for opening and closing.
15 denotes an electric motor.
15.1 denotes a chain transmission.
15.2 denotes a shaft for a feed screw.
16 denotes an after-mixer for glass powder and foaming agent.
16.1 denotes the direction of rotation of the feed screw.
17 denotes a pressure regulator.
17.1 denotes laser level measurement.
18 denotes a pressure sensor/manometer.
19 denotes an outlet for unwanted gas.
20 denotes quality control of air/gas.
21 denotes a temperature sensor/manometer.
22 denotes a feed chamber.
22.1 denotes a level sensor.
23 denotes a feed screw chamber.
23.1 denotes a feed screw for feeding the glass mixture to surface level 25.
23.2 denotes a chamber for the planing device.
24 denotes glass flour with foaming agent in free fall from the feed screw.
25 denotes a level sensor/manometer for max, minimum level.
25.1 denotes further heating phase/melting phase during production.
26 denotes an extruder chamber.
27 denotes a conical surface with a given angle for direct heat transfer to the glass mixture.
27.1 denotes a conical surface with a given angle for indirect heat transfer to the glass mixture.
28 denotes glass flour with admixed foaming agent in the expansion phase.
29 denotes an extruder chamber.
30 denotes an internal extruder device.
30.1 denotes an internal heating device.
31 denotes a temperature sensor/manometer.
31.1 denotes fully expanded glass foam in the extruder chamber.

Figures 1, 2:
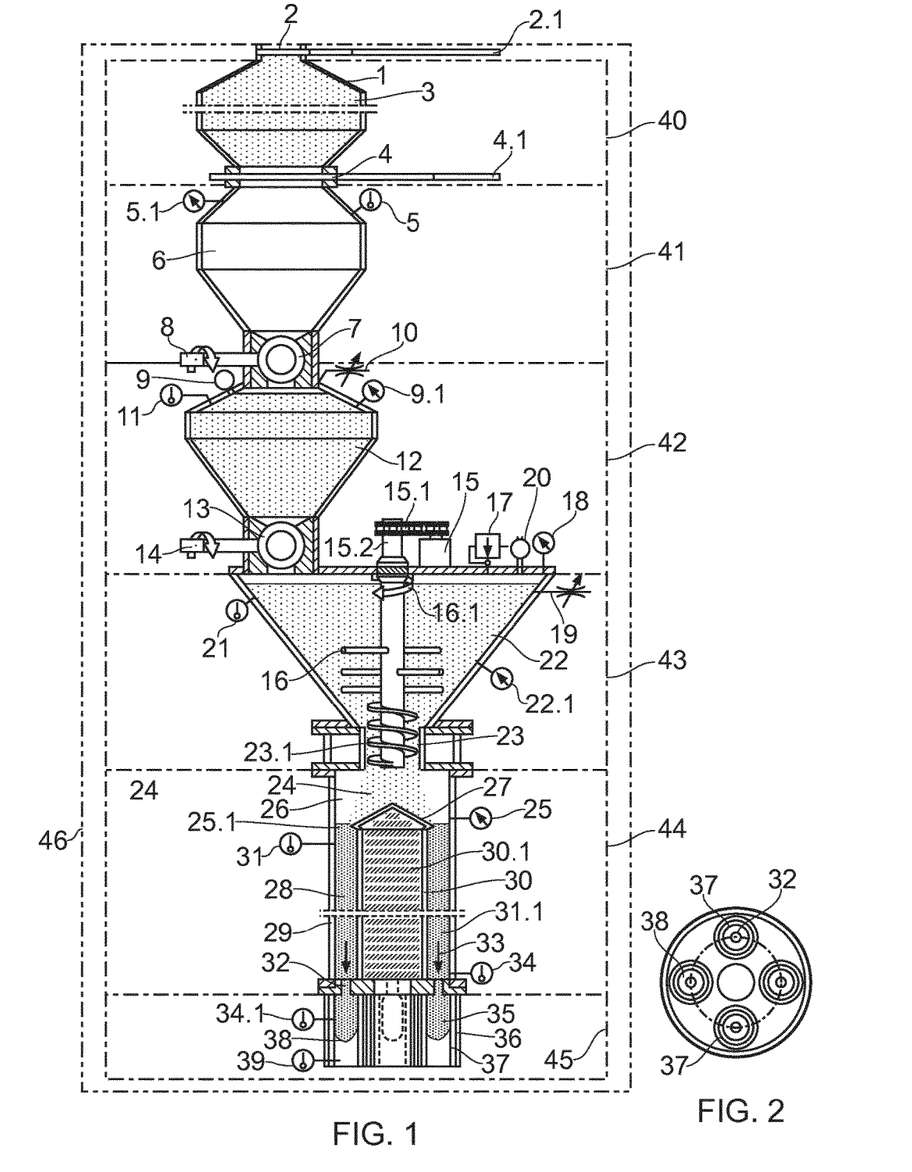
FIG. 1 is a sectional view of an apparatus according to the invention.
FIG. 2 shows in detail an example of a nozzle arrangement with four nozzles of cylindrical shape.

32 denotes location and arrangement for nozzle.
33 denotes outlet to the nozzle.
33.1 denotes nozzle outlet.
34 denotes surface temperature, sensor/manometer.
34.1 denotes outlet temperature from nozzle, sensor/manometer.
35 denotes glass foam exiting nozzle.
36 denotes external nozzle pipe.
37 denotes lining to which the foamed glass does not stick.
38 denotes the expansion chamber outside the extruder chamber.
39 denotes temperature sensor/manometer for expansion zone.
40 denotes heat for silo section.
41 denotes heat for dosing chamber.
42 denotes heat for sluice chamber.
43 denotes heat for feed chamber.
44 denotes external heat for extruder chamber.
45 denotes heat for expansion chamber.
46 denotes thermal insulation for the whole construction.
47 denotes a device where a given air pressure cuts hot foamed glass.
47.1 denotes one of two nozzle plates.
48 denotes one of two air nipples.
49 denotes the direction of pre-heated air/gas.
50 denotes a nozzle inlet for air/gas.
51 denotes a slot opening for supplied air pressure radially directed inwards towards the centre in the cutting phase.
52 denotes a foamed glass "sausage" prior to cutting.
52.1 denotes a foamed glass "sausage" prior to cutting.
53 denotes a foamed glass pellet after cutting the foamed glass "sausage".
54 denotes an outer extruder tube.
55 denotes an inner extruder tube.
56 denotes the direction of foamed glass towards the nozzle.
57 denotes a slot opening between outer extruder tube 54 and inner extruder tube 55.
58 denotes a nozzle with round profile.
59 denotes a nozzle with triangular profile.
60 denotes a nozzle with star profile.
61 denotes an extruder tube/container of heat resistant material.
62 denotes an extruder chamber containing foamed glass under pressure/positive pressure at high temperature.
63 denotes the flow direction of foamed glass in the extruder chamber.
64 denotes an adapted end plate for extruder tube/container with associated duct for outlet in centre.
65 denotes a nozzle that forms profile and diameter of pellets/product shape in the production phase.
66 denotes a slot opening for supplied air pressure radially directed inwards towards the centre.
67 denotes a peripheral and radial air space outside the circular slot opening.
68 denotes the direction of supplied activated compressed air.
69 denotes the direction of supplied activated compressed air.
70 denotes the direction of activated compressed air radially in towards the centre.
71 denotes the direction of activated compressed air axial to atmosphere.
72 denotes a sleeve/vessel with integrated recesses.
73 denotes a through hole/channel for supply of compressed air.
74 denotes a through hole/channel for supply of compressed air.
75 denotes the outer limit radially of the parallel slot opening.
76 denotes an adapted outlet after the nozzle.
77 denotes pellets that are in cutting mode.
78 denotes graphite lining or similar suitable material.
79 denotes an impermeable and smooth surface.
80 denotes an air space of adapted dimension.
81 denotes inlet for compressed air.
82 denotes inlet for compressed air.
83 denotes a primary cutting zone provided by compressed air.
84 denotes an elliptical pellet with sealed surface.
85 denotes the foamed glass structure in outer zone of cut surface.
86 denotes the foamed glass structure in inner zone of cut surface.
87 denotes the product surface condition at each end that may be uneven.
88 denotes cut surfaces.
89 denotes star-shaped/elliptical pellet with sealed surface.
90 denotes flat and profiled surfaces.
91 denotes cylindrical/spherical pellet.
92 denotes a feeding device for passing the glass mixture from the feed chamber 22 to the extruder 29 in controlled volume/mass per time unit.
93 denotes a rotating plane blade that releases a controlled amount of the glass mixture from the feed chamber 22 per time unit.
94 denotes the slot opening through which the glass mixture can pass.
95 denotes the drive shaft.
96 denotes the direction of rotation of the planning device.
97 denotes expanded, viscous glass foam material
98 denotes the extruder nozzle
99 denotes a quick connection
100 denotes a nozzle extension
101 denotes a mold inner wall
102 denotes a mold outer wall
103 denotes the inner space of a mold
104 denotes a bottom plate
105 denotes a mold shaft
106 denotes viscous foamed glass material at a filled level
107 denotes an insulated chamber The drawing FIG. 1 shows six main sections from 40 to 45 where the hot section 40 contains silo 3 that is receiving vessel for crushed glass with admixed foaming agent. Hot section 41 contains dosing chamber 6 for volume determination of the glass mixture. Hot sections 42 and 43 contain respectively sluice chamber 12 and feed chamber 22 that constitute the sluice device for moving the glass mixture at a given positive pressure to the extruder device 29 in hot section 44 to be able to drive fully expanded glass foam 31.1 out through nozzles 33.1 to the expansion chamber 38 in hot section 45 where the final expansion takes place at atmospheric pressure or lower.

Silo 1 may have a valve device 2 with controlled gate valve or the like 2.1 for closing off the main chamber 3 for efficient heat recovery. Inlet valve 4 is closed when a given volume of glass mixture has reached the dosing chamber, controlled by level sensor 5.1 with controlled preheating from heat sensor 5. Valve 7 for inlet to the sluice chamber 12 is closed in this position via valve shaft 8. In order to monitor any accumulation of unwanted gases in the sluice chamber 12, there is provided a control unit 9 with pressure sensor 9.1 and with associated pressure regulation 10 and temperature sensor control 11.

Valve 13 for inlet into the feed chamber 22 is closed in this position via valve shaft 14 and an adapted volume amount of glass mixture is in the sluice chamber 12 at a given positive pressure. According to one aspect of the invention, the pressure is in the range of from above zero bar to 10 bar, for example from 1.5 bar to 10 bar, for example 3-7 bar.

The feed chamber 22 is full and the production process can start with the charging of glass mixture via the feed screw 23.1 through the feed screw chamber 23 when the extruder 29 has reached given production temperature 31. The feed screw is driven by motor 15 with transmission 15.1 to shaft 15.2 with mixing device 16 to maintain good incorporation of foaming agent along the way with direction of rotation 16.1 resulting from the operational direction of the feed screw 23.1.

The feed screw 23.1 has a rotating speed that is adapted to the production capacity of the extruder 29 in order to effect that a measured amount of glass mixture is added in free fall 24 in free fall chamber 26 up to the conical surface 27 for direct heating as the glass mixture is added, in order subsequently, in liquid state, to run down into the extruder chamber 28 for more heating from internal heating device 30.1 and external heating device to a given temperature level for further reaction until level 25 is reached within a given tolerance, as then an automatic control system will take over and ensure that this level is maintained in the production process.

When the temperature sensors 31 and 34, which are set to a given production temperature, are activated, feed chamber 22 and extruder chamber 29 will be pressurised by the pressure regulator 17 set for a given production pressure consisting of air/gas and this positive pressure will now push the fully reacted and partly expanded foamed glass towards the outlet to the nozzle 33 and out through the nozzles 32 to the expansion chamber 38 which lies outside the extruder chamber at atmospheric pressure or lower, and here the partly expanded foamed glass 31.1 from the extruder chamber 29 will undergo further expansion 35 owing to the low pressure in the expansion chamber 38 at a given temperature 39 that is provided by hot section 45 and is advantageous for obtaining a satisfactory foamed glass product. Linings 37 can be arranged on the inside of the nozzle pipes 36 consisting of a material that prevents the hot and sticky foamed glass from sticking to the surface of the path out to further treatment/processing such as cutting into pellets or casting where given temperature 39 is provided by hot section 45.

FIG. 2 shows FIG. 1 from below and makes visible four nozzles of cylindrical shape by way of example, and here a plurality of nozzles and shape can be used according to need.

In this production process, importance is given to optimal utilisation of supplied thermal energy and this is therefore included as an important part of the design development. The whole production unit is surrounded by heat-insulating material 46, planned for efficient heat recuperation in all stages. Different energy forms can be used for the process, for example, use of gas, electro, induction, laser or a combination of the said energy forms.

Figure 3:
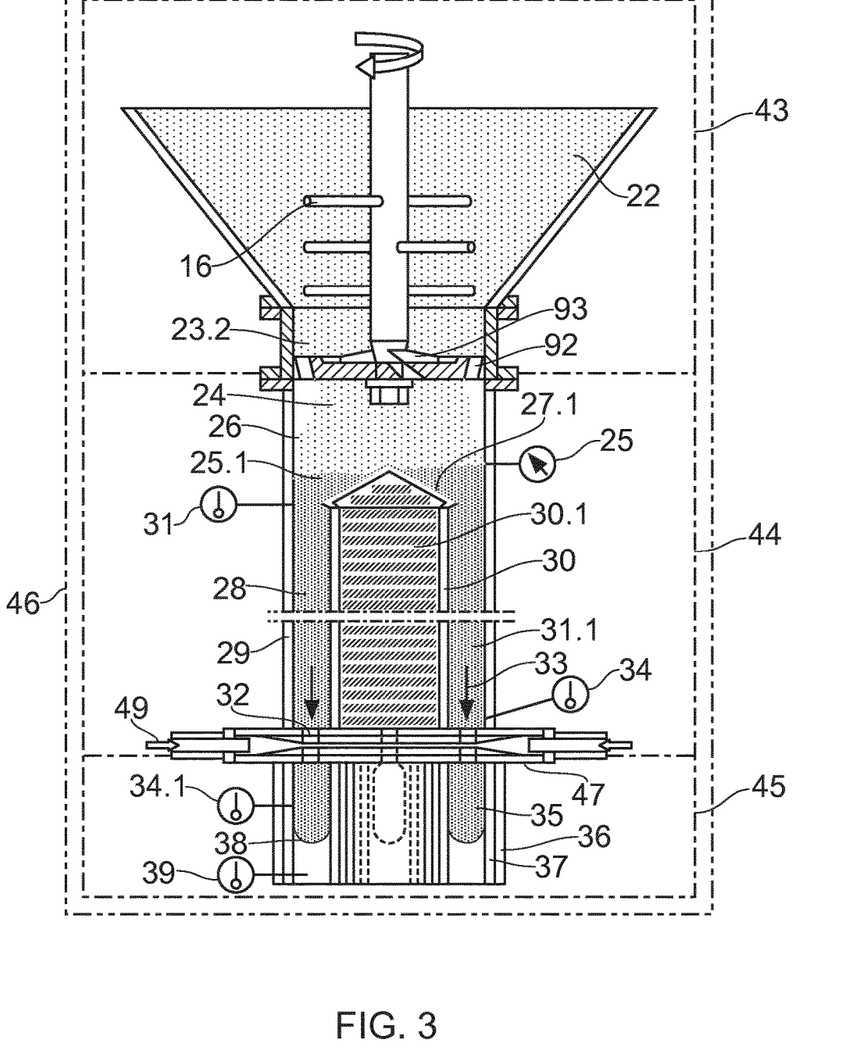
FIG. 3 shows an extruder variant where a special planing device 92 is used, shown in separate FIG. 12, for delivery of the glass mixture from feed chamber 22 to surface level 25.
Figure 12:
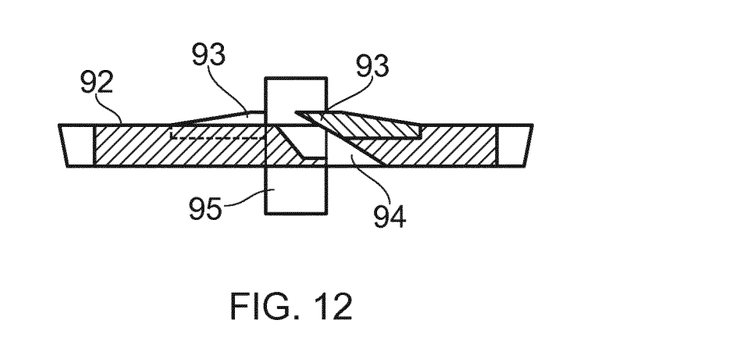
FIGS. 12 and 13 show a feeding device for moving the glass mixture from the feed chamber 22 to the extruder chamber 29.

FIG. 3 shows an extruder variant where a special planing device 92 is used, shown in separate FIG. 12, to convey the glass mixture from feed chamber 22 to surface level 25 and this variant gives highly regular and controlled supply provided by the plane blade 93. The conical surface 27.1 is lowered relative to level 25 such that indirect heating of ground glass powder in free fall 24 is obtained through the heating phase/location 25.1

Figure 5:
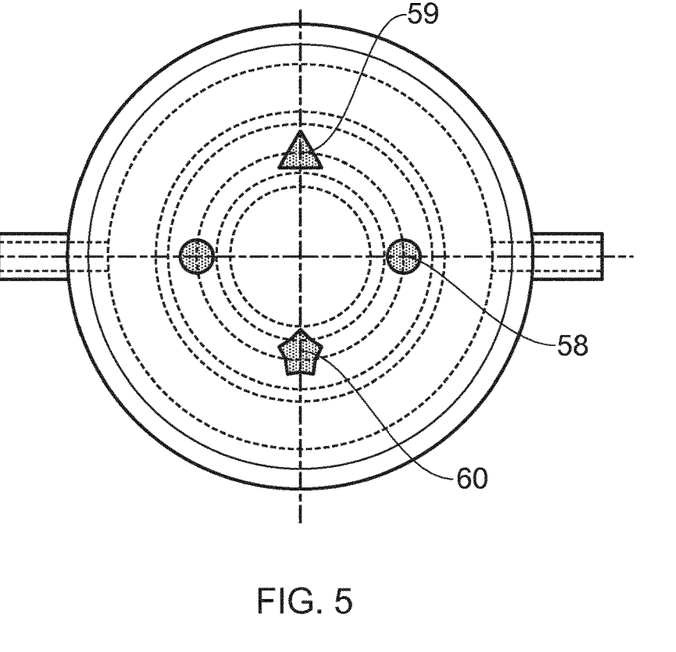
FIGS. 5 and 6 show one tool 47 for cutting foamed glass having a high temperature to produce pellets with a glazed surface.
Figure 6:
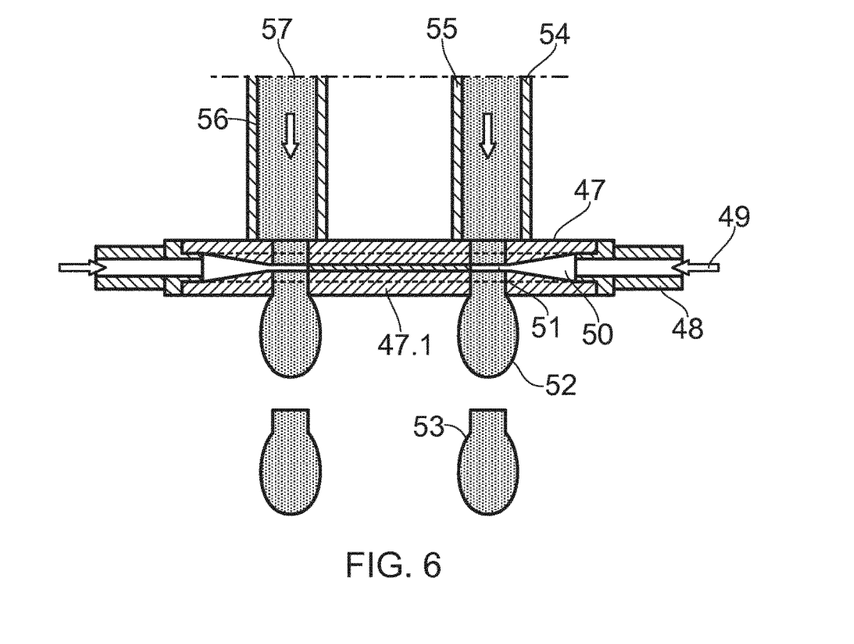

FIG. 3 has an installed cutting device 47 shown in separate FIG. 5 and FIG. 6 for cutting expanding foamed glass with a given profile in given lengths in the production process to form pellets with glazed surface.

Figure 4:
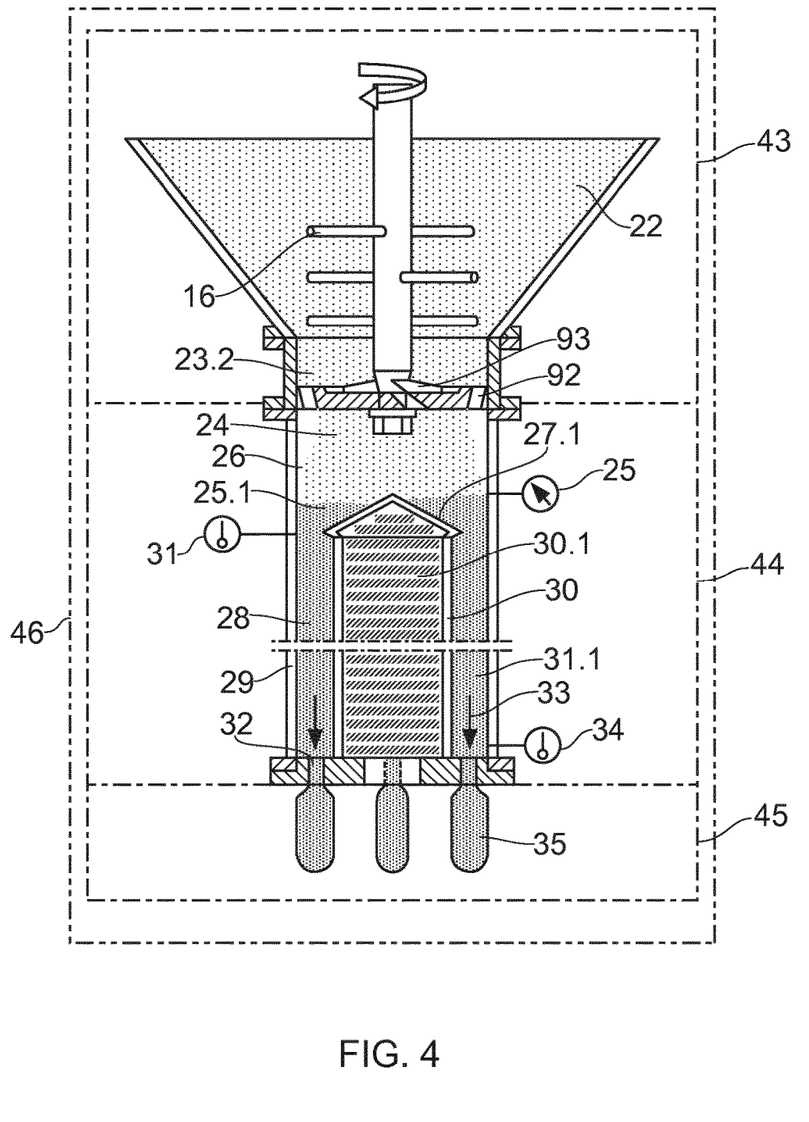
FIG. 4 shows another exemplary embodiment of an extruder variant.

FIG. 4 shows, in addition to FIG. 3, an extruder variant that is designed for production of shaped parts for thermal/cold insulation of pipes, casting of x number of variants of building blocks etc. This can be done by arranging and connecting to casting tools for one particular product inside hot section 45.

FIGS. 5 and 6 show a tool 47 for cutting foaming glass at high temperature to produce pellets with glazed surface. This tool is designed for cutting expanding foamed glass from a plurality of nozzles 32 and is constructed of two nozzle plates 47.1 to form slot opening 51 with a given basic dimension and associated tolerance in order to achieve the desired cutting effect from supplied compressed air/gas 49 through the nozzle inlet 50. With pulsating air pressure/gas, we can obtain an efficient production of pellets 53, and with substantial scope for producing a large range of dimensions.

Figure 7:
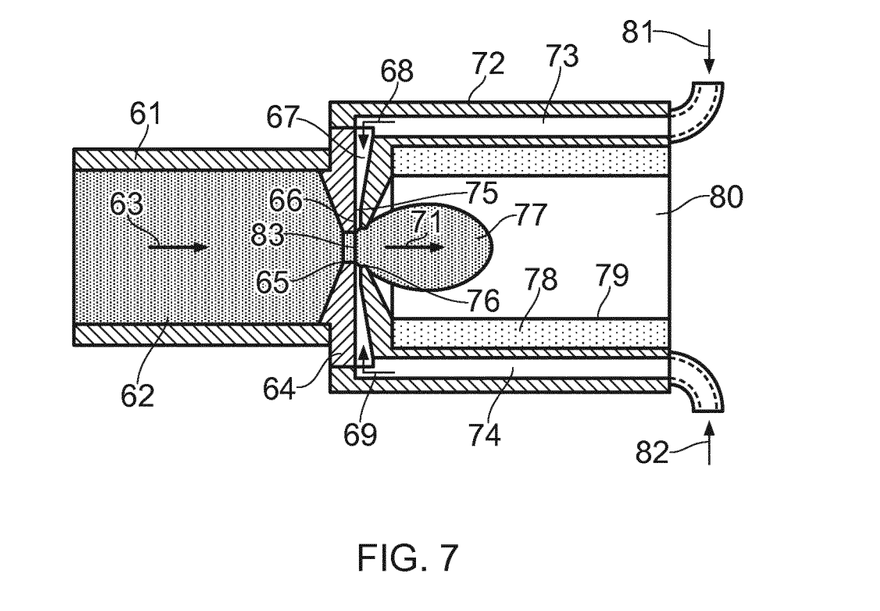
FIGS. 7 and 8 show one tool that is constructed to cut expanding foamed glass from a nozzle 65.
Figure 8:
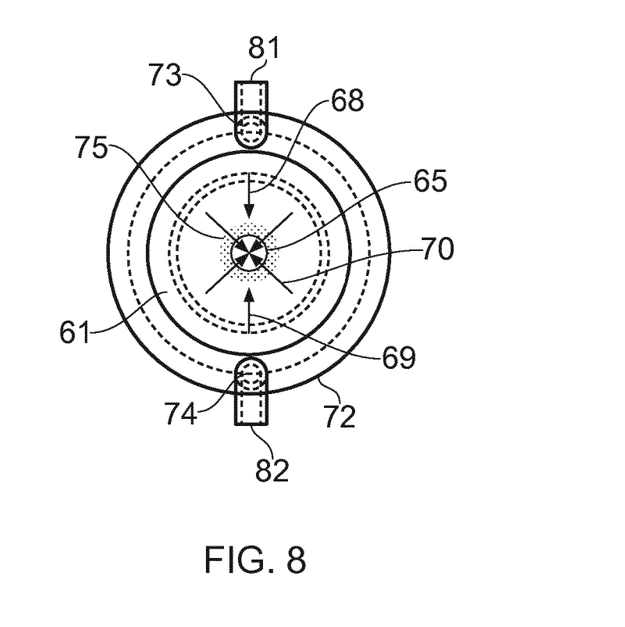

FIG. 7 shows a tool that is designed to cut expanding foamed glass from a nozzle 65 which is supplied with expanding foamed glass 62 at positive pressure in the direction of flow 63 up to the nozzle 65 of a given profile, and the cutting principle here is almost identical to the cutting principle in FIGS. 5 and 6 with the exception, among others, that the design in FIGS. 7 and 8 will have greater adaptation possibilities for larger and varying product profiles.

Figure 9:
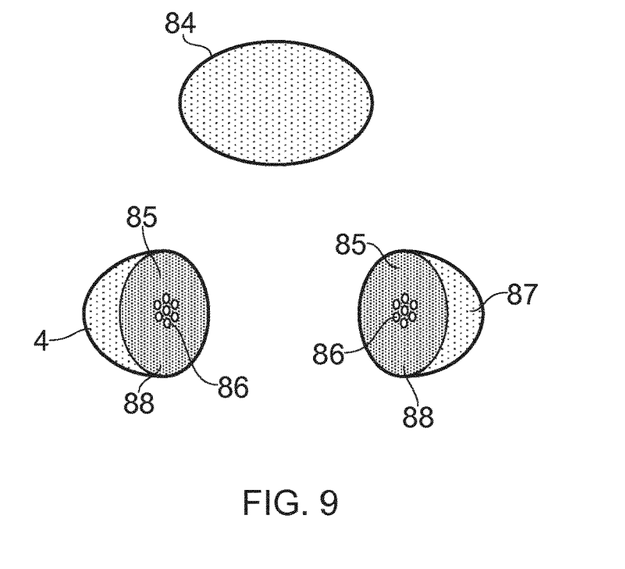
FIGS. 9, 10 and 11 show a selection of products that are produced from a given nozzle profile.
Figure 10:
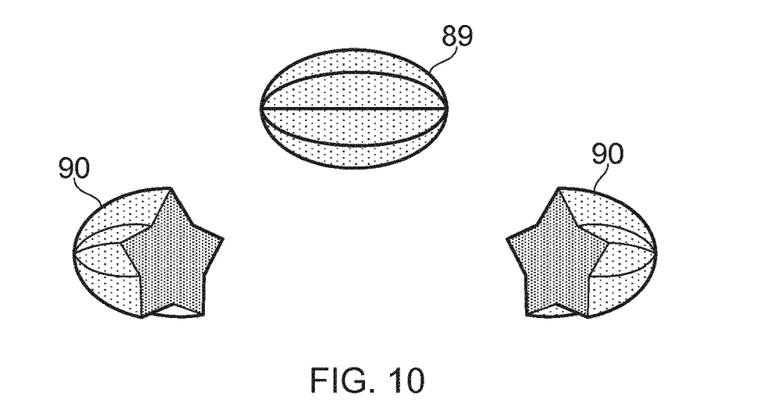
Figure 11:
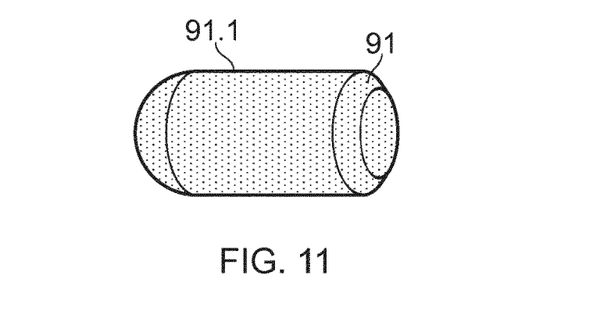

FIGS. 9, 10 and 11 show a selection of products produced on the basis of a given nozzle profile.

FIG. 9 shows an elliptical pellet 84 with sealed surface consisting of glazing that has the effect of protecting the cell structure 85 and 86 from the outside of the surrounding shell 87 which makes the product watertight and thus endows the product with high compressive strength.

FIG. 10 shows an elliptical/star-shaped pellet with surface 89 consisting of corresponding protection as that shown in FIG. 9, apart from the form of the surface, which here consists of flat portions 90 because of the star shape, which can make the product unique for further processing/development and use.

FIG. 11 shows a cylindrical/spherical segment shaped pellet 91 with surface 91.1 consisting of similar surface protection as that shown in FIGS. 9 and 10, apart from the shape with an option of length selection, which can make the product extremely useful.

Figure 13:
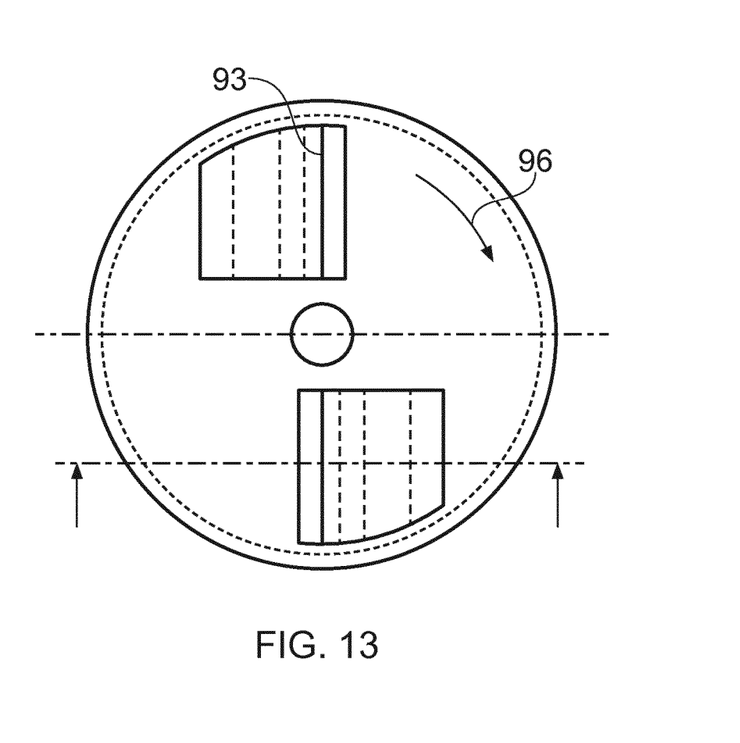

FIGS. 12 and 13 show a feeding device for moving the glass mixture from the feed chamber 22 to the extruder 29 in controlled volume/mass per time unit and with even distribution of the mixture. This tool consists of a plate 92 with plane blades 93 that have a downward and throughgoing slot opening 94 through which the glass mixture passes on its way to the extruder chamber 29 with surface 25.1 and direction of rotation 96 driven by drive shaft 95.

In addition to the apparatus described above, the invention comprises a method for manufacturing foamed glass. The method is characterised by the following aspects:

According to an aspect, the invention comprises a method for production of foamed glass where glass flour that is mixed with a given percentage of expansion additive is transported in a closed pipe system to the surface level 25 in the extruder chamber 29 where heat is supplied until it melts on its way into the extruder chamber 29 for subsequent extrusion. The glass mixture consisting of ground glass powder and expansion additive is passed from feed chamber 22 through opening 23 and in free fall 24 through free chamber and hot chamber 26.1 to the surface level of the extruder chamber (29.

According to another aspect, the feeding from jigger chamber (23 is effected by an automatic dosing and distributor system almost identical to the cheese slicer principle transferred to a rotating jigger 15.1 with plane blade facing up and adapted slot opening (15 will be able to dose and distribute with high precision a given amount per rotation up to the surface level 28.3 of the extruder chamber.

According to another aspect, ground glass powder with expansion additive is fed through a closed system with computerised pressure regulation 17 to be able to maintain desired positive pressure 18 with a given pressure tolerance for feed chamber 22 and extruder chamber 29.

According to another aspect, the invention comprises a method for production of foamed glass wherein glass flour mixed with a given percentage of expansion additive is transported in closed pipe system to the surface level 28.3 in the extruder chamber 29 where it is heated up by external heat 44 and internal heat 27 until it melts on its way into extruder chamber 29 for subsequent extrusion. The glass mixture and foaming agent undergoes a reaction process in the extruder chamber 29 that has an adapted hot environment for expanding foam on its way towards nozzle outlet 33 and out through nozzle 33.) where glass foam 35 is formed in the expansion chamber 38 at atmospheric pressure or lower.

According to another aspect, a mixer 16 is provided for maintaining a good incorporation of expansion agent in the glass powder on its way to the jigger 15.1

According to another aspect, a reaction process takes place in the glass mixture in the extruder chamber (29 which has a suitable external geometric form 30 and a suitable internal geometric form 31 to be able to achieve maximum heat utilisation, expansion properties and flow properties towards the nozzle inlet 33.

According to another aspect, partly expanded foamed glass of controlled density and viscosity passes out through nozzles 33.1 that are adapted and dimensioned to the condition of the glass foam in order to maintain adapted pressure 18 in the extruder chamber 29 and to be able to guide the volume flow of glass foam out of the extruder chamber in the production phase.

According to another aspect, in the final phase of the expansion the unfinished foamed glass will undergo automated heat treatment from supplied heat 45 with temperature monitoring 39 for formation of foamed glass 35 and temperature monitoring 39.1 for the expansion chamber 38 to be able to obtain desired density, hardness and compressive strength.

According to another aspect, the foamed glass 35 in the expansion chamber 38 has a sticking effect in this phase and therefore there is provided a lining 37 of material quality that prevents the foamed glass 35 from sticking to this repellent surface in the production phase.

According to another aspect, a positive pressure is built up in the extruder chamber 29 and the feed chamber 22 in the start-up phase and in the production phase such that there is a need for control unit with pressure regulation to be able to maintain the pressure within a given tolerance.

Figure 21:
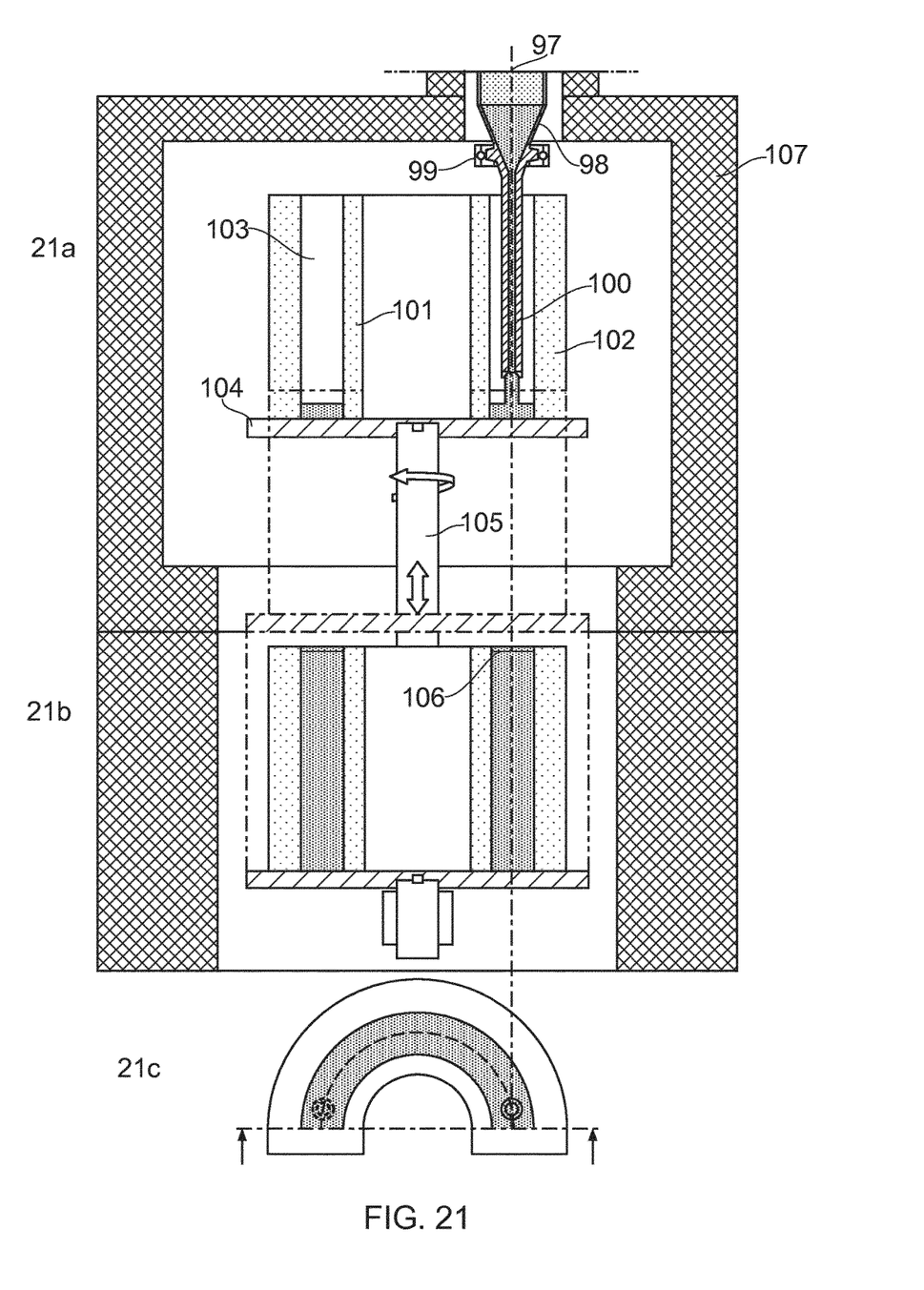

FIGS. 21 a, b and c illustrate an example of a mold for forming foamed glass products of various shapes. In this example a half cylinder is illustrated, however various other shapes are possible. As shown, viscous glass material 97 exits a nozzle 98. The nozzle is connected by a quick connection 99 to a nozzle extension 100. The nozzle extension extends into a mold having an inner wall 101 and an outer wall 103, forming an internal space 103. The mold rests upon a plate 104 that is rotatable and able to be raised and lowered by a shaft 105. The plate is rotated and gradually lowered as foamed glass material is deposited into the mould until the mold is filled to level 106 as shown in FIG. 21 b. FIG. 21 c shows the arc traveled by the nozzle during filling. In the case of a different shape, for example a block, the mold can be arranged to oscillate back ad forth and sideways while gradually being lowered in order to fill a mold having such a shape. The mold is preferable arranged in a chamber having insulated, possibly heated chamber 107.

Various Aspects/details of the Invention

Figure 17:
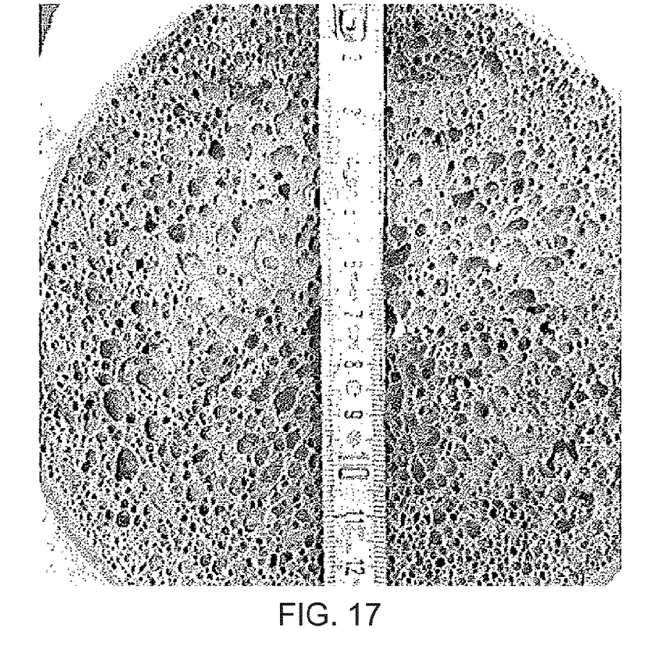
FIG. 17 shows an example of gradual increase in cell size in towards the centre on cooling when discharged onto the conveyor belt.

1. The foamed glass product according to the invention shows proportional increase in size of cell structure owing to a pressure drop inside the product during a cooling cooling process that's start at the surface and at a temperature where the viscosity still is low enough in the centre to allow the gas bubbles to further expansion. The closer to the centre, the larger the cell structure becomes. See FIG. 14 and FIG. 17 below.
2. According to an exemplary embodiment, the process can be carried out by admixing fine-grained particles 1-20 microns in size which have a melting point above 1100 degrees Celsius, and which do not react chemically with the mixture. This means that the compressed bubbles, which are under positive pressure, attach themselves to these particles in a nucleation process such that on a subsequent discharge through a nozzle at normal pressure the bubbles will expand homogeneously and not attempt to merge with larger bubbles. This ensures a more homogeneous cell structure. Examples of nucleating agent include finely ground kaolin powder or other finely ground ceramic material.
3. A reactive ingredient (SiC) and one or more oxidants, for example, $MnO_2$, are stirred together before they are added to glass powder or ground glass particles. This is to ensure that as many reactive particles as possible come into direct contact with one or more oxidants such that the combustion is as efficient as possible.
4. According to an aspect of the invention, raw materials are preheated so as to allow a reduction in the time it takes to melt the glass in the extruder chamber. Preheating temperature is adapted to the glass material used, but is not set so high that the glass sticks. An example of temperatures can be in the range of 200-400 degrees Celsius.
5. It is advantageous that the total area of the nozzles is proportional to the extruder chamber volume such that desired pressure and speed of the process can be reached. An example of this can be a volume of 9.6 liters and an area of nozzle corresponding to 7 $mm^2$.
6. The smaller the ratio between total area of the nozzles and extruder chamber, the larger the pressure that can be obtained.
7. According to another aspect of the invention, it is possible to prevent air bubbles from merging together to form larger bubbles during the expansion phase by incorporating fine particles, so-called nucleating agents in the ground glass/glass powder before it is added to the extruder chamber under positive pressure. For instance, 0.1-1% kaolin powder having a particle size of 10 microns can be mixed into the ground glass having a particle size of 0-100 micron before it is added to the extruder chamber under 3 bar pressure.
8. According to the invention, an almost glassy sealing of the surface can be obtained by allowing the fully expanded glass foam to remain a given time in the expansion chamber before a controlled and gradual cooling is started. An example of this may be 3-5 min residence time at a temperature of between 980-1040 degrees Celsius.

Figure 14:
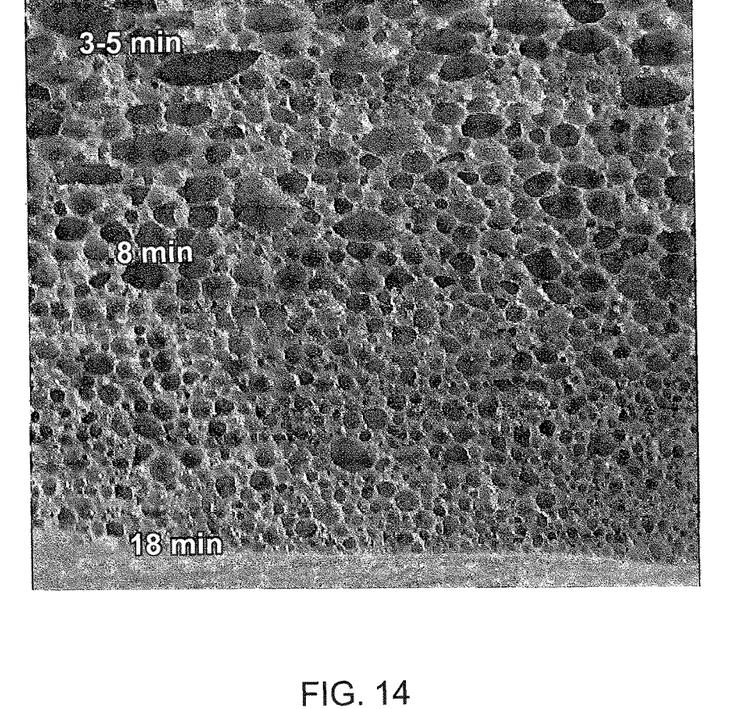
FIG. 14 is a close-up view of a section through the foamed glass product according to the invention, and shows a heat dependent gradual increase in cell size in towards the centre of the product on cooling.

9. According to the invention, a gradual increase in cell size can be obtained that is larger the further in towards the core of the product by carrying out a gradual cooling. The size of the cells will depend on the speed of the cooling. The shorter the cooling time, the smaller variation in cell size. An example of this is seen in FIG. 14 where the glass foam has been cooled down from 1040 degrees Celsius to 800 degrees Celsius in the course of 10 min. Subsequently from 800 degrees Celsius to 500 degrees Celsius in the course of 30 min.

10. According to an exemplary embodiment, direct induction is used on the lower half of the decomposition chamber to secure a reaction temperature that is as constant as possible, with associated homogeneous viscosity and hence a homogeneous distribution of the bubbles formed by the decomposition before the compressed glass foam enters into the expansion chamber.

Figure 15:
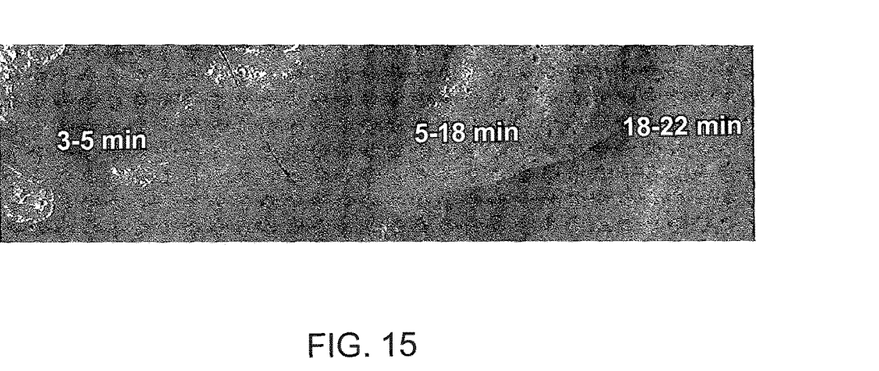
FIG. 15 shows a time dependent change in surface sealing at 1040 degrees C. prior to cooling. Three-five min gives a glassy sealed surface, 5-18 min gives a slightly more matt surface with some collapsed cells, 18-22 min gives a matt but impermeable surface.
Figure 16:
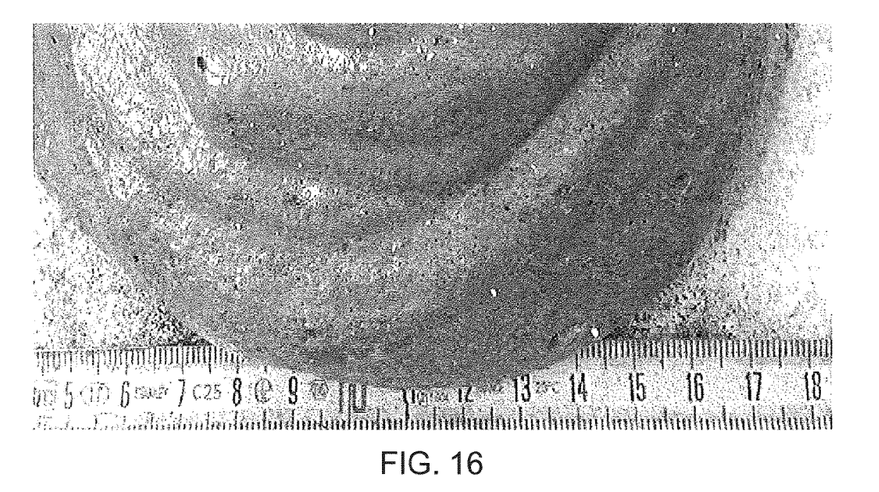
FIG. 16 shows an example of discharge at 1040 degrees, via a nozzle of diameter 3.0 mm and 3 bar pressure onto the conveyor belt.

11. According to an aspect of the invention, the type of surface that the product is to have can be determined. The shorter the time the finished product is allowed to remain in the expansion chamber, the more sealed and glassy the surface becomes. Similarly, a longer time will form a more matt surface with open cell structure at some places in the surface. See FIG. 15.

12. A brief temperature increase (1-10 min) in the range of 1000-1100 degrees C. on the moulds will give an increase in sealing and compression strength of the surface of the glass foam that is in direct contact with the wall due to a collapse in the cells closest to the wall of the moulds.

13. A rapid cooling of the finished foam will give a low increase in cell size structure in towards the centre of the expanded foam. Similarly, a slow cooling will give a high increase in cell size structure in towards the centre of the expanded foam. The absolute cell size in towards the centre of the expanded foam can therefore be influenced by changing the speed of the cooling.

14. A desired increase in pressure inside the extruder chamber without running the risk of a blow out of compressed air through the melt can be obtained by increasing the ratio of the area of the melt's surface to the area of the surrounding walls.

Figure 18:
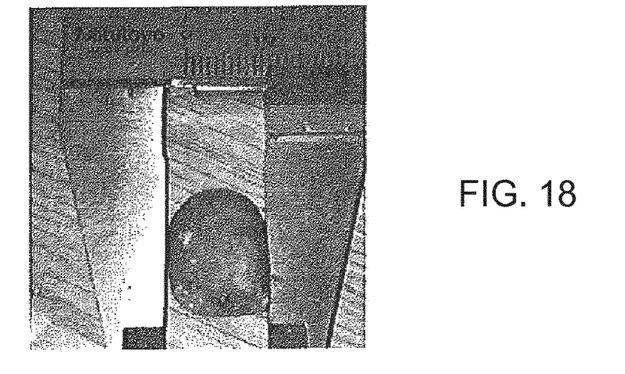
FIGS. 18 and 19 show a spherical foamed glass product according to the invention, with a density of 200-400 kg/m3.
Figure 19:
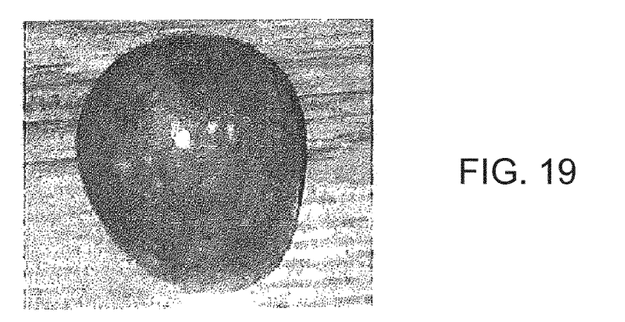

Examples of Products and Product Properties Made of Sealed Foamed Glass According to the Invention:
Added Material in Lightweight Concrete and Building Blocks Based on Sealed Foamed Glass.
Properties:
Almost spherical shape. (See FIGS. 18, 19)
Sealed and glassy, almost polished surface.
Size: 5-15 mm in diameter.
Cell size: 0 micron at the surface rising to 0.1-2 mm at the core.
Gradually increasing cell size from the surface in towards the core. The cell structure is formed by a pressure drop in the core during cooling. This is because the surface is cooled first, forms a firm and pressure-tight surface, then the ball is cooled down gradually towards the core with a pressure drop as a result. The pressure drop is greatest at the core. The cell size will increase proportionally with pressure drop.
Waterproof.
Density 200-400 kg/m3.

The product consists of up to 95-97% recycled glass with a fraction size of 0.1 mm -2.0 mm and 3-5% reactive ingredient/foaming agent (SiC), oxidant (MnO2) and nucleating agents.

The product is formed by pressing foamed glass under positive pressure through a small nozzle where the expansion takes place in the nozzle orifice, and at a temperature of from 950-1100 degrees C. There will be a slightly higher temperature on the outside of the nozzle orifice than inside the extruder chamber in order to obtain a desired sealing. The foamed glass is cut to the desired size and falls down onto a conveyor belt where it is cooled rapidly to below 500 degrees C.

It may be relevant to use induction directly on the foamed glass or on the nozzle to obtain a constant temperature during the brief time interval that arises during expansion out through the nozzle orifice.

Building Block Based on Recycled Glass.
Up to 95-97% recycled glass with fraction size of 0.8 mm-40 mm and 3-5% reactive ingredient/foaming agent (SiC), oxidant (MnO2) and nucleating agents. Produced normally at temperatures of between 1000 C and 1100 C and at pressure of between 1 bar and 6 bar.

Essentially sealed surface and dense cell structure gives high resistance to water penetration.

Increasing pore size in towards the core of the block due to pressure drop during cooling.

Figure 20:
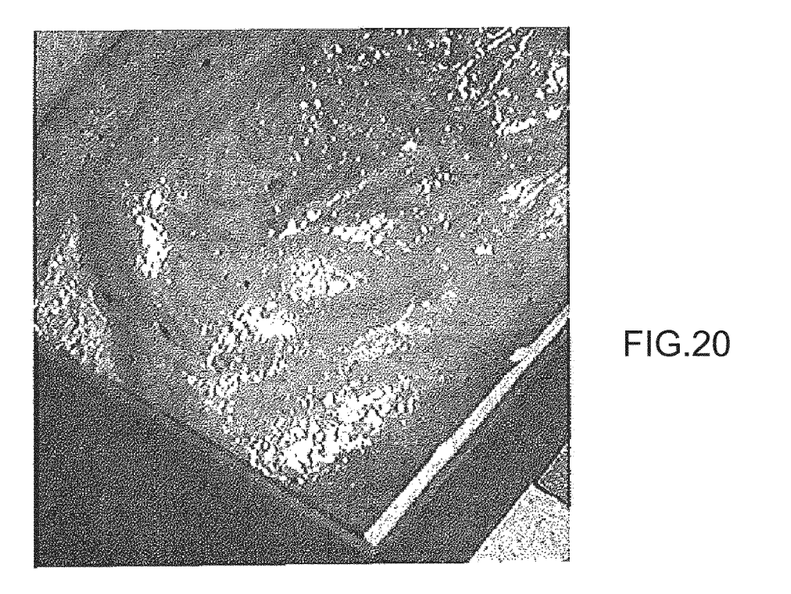
FIG. 20 shows an example of casting foamed glass in a mould.

During filling of the mould (see FIG. 20) and during cooling, induction can be used to secure a stable temperature until the form has expanded to atmospheric pressure. Other suitable heating methods can also be used. The block is then cooled gradually to below 500 degrees C. where the tensions in the product are removed.
Standard block size: 440 mm×215 mm
Thickness: 75 mm-215 mm
Density: 300-600 kg/m3
Conductivity: <0.15 W/mK
Strength: 6.5-10.4 N/mm2

The density of the product can be changed by increasing the amount of foaming agent and by reducing fraction size of the raw glass material. In addition, a change in pressure in the reaction chamber can be used to give changes in density. Increased pressure gives reduced density and more homogeneous cell structure within our pressure range.
Sealed and Shaped Lightweight Aggregate for Infrastructure:
Properties:
Fraction size: 10-60 mm
Sealed surface
Cell size from 1-4 mm
Block density: 280-400 kg/m3
Bulk density: 160-240 kg/m3
Compression strength: >10.4 N/mm2
Waterproof The product can be made from both crushed glass cullets and milled glass cullets.
A: Crushed glass cullets from recycled glass
Fraction: 0-1.6 mm
95% recycled glass
5% SIC+MnO2
Temp in extruder chamber 1040 degrees C.
4 bar pressure in extruder chamber
Size of nozzle: 3 mm in diameter
Density: 375 kg/m3
Bulk density: 220 kg/m3
Compression strength >100 kg/cm2
Sealed surface Cell size: 1-6 mm
B: Dried and milled glass powder from recycled glass
Fraction: 0-100 micron.
96% Glass powder
4% SIC+MnO2
Temp in extruder chamber 1040 degrees C.
3 bar pressure in extruder chamber
Size of nozzle: 3 mm in diameter
Density: 280 kg/m3
Bulk density: 164 kg/m3
Compression strength: >100 kg/cm2
Sealed surface
Cell size 1-2 mm The compressed foam glass was extruded into a graphite mould in the expansion chamber with the dimensions of 20 mm×20 mm×60 mm to form a rectangle with sealed surface on all sides.

Crushed Lightweight Aggregate for Infrastructure:
Open cell structure on the surface where it has been crushed
Closed cell structure
Density: 280 kg/m3-400 kg/m3
Bulk density: 160-240 kg/m3
Compression strength: >10.4 N/mm2
Cell size: 1 mm-10 mm
95-97% recycled glass with fraction size from 100 micron-4 mm.
3-5% reactive ingredient/foaming agent (SIC), oxidant (MnO2) and nucleating agents.
Produced at a temperature between 1000-1070 degrees C. and a 1-6 bar pressure in the extruder chamber.

Extruded through a nozzle into an expansion chamber and down onto a moving belt.

After expansion and cooling the foam glass are crushed into aggregates with a fraction size of 20-60 mm.

The invention claimed is:

1. An apparatus for the production of foamed glass, comprising
   a. A silo for receiving a glass mixture, said glass mixture comprising crushed or ground glass mixed with a foaming agent,
   b. A sluice chamber arranged to receive a volume of glass mixture from the silo, said sluice chamber being separated from the silo by a first closable valve, said sluice chamber further comprising a heat source, a pressure source, a temperature sensor and a pressure sensor, said heat source and temperature sensor arranged to preheat the glass mixture and said pressure source and pressure sensor arranged to apply a positive operating pressure,
   c. A feed chamber arranged to receive a volume of glass mixture from the sluice chamber, said feed chamber separated from the sluice chamber by a second closable valve, said mixing chamber being subjected to the positive operating pressure and comprising a heat source, a mixing device comprising a motorized, rotating shaft, and a feeding device,
   d. An extruder chamber arranged to receive a volume of glass mixture from the feed chamber via the feed device, said extruder chamber being subjected to the positive operating pressure and comprising a heat source arranged to raise the temperature of the interior of the extruder chamber to an operating temperature at which the crushed or ground glass melts, and which activates the foaming agent, thereby forming a viscous compressed foamed glass material,
   e. One or more nozzles arranged at an end of the extruder chamber, through which the viscous compressed foamed glass material may exit under influence of the positive operating pressure,
   f. An expansion chamber arranged to receive foamed glass mixture from the nozzles, said expansion chamber having a pressure that is less than the positive operating pressure and a temperature that is less than the operating temperature of the expansion chamber,
      whereby viscous compressed foamed glass material will exit the nozzles into the expansion chamber and thereafter expand and cool into a solid, foamed glass product.

2. An apparatus according to claim 1 further comprising a dosing chamber arranged intermediate the silo and the sluice chamber, said dosing chamber being separated from the sluice chamber by the first closable valve and separated from the silo by an inlet valve, said dosing chamber arranged to receive a volume of glass mixture from the silo prior to passing the glass mixture to the sluice chamber, said dosing chamber further comprising a level sensor arranged to detect the volume of glass mixture from the silo and to automatically open and close the first valve based upon a detected volume of glass mixture in the dosing chamber.

3. An apparatus according to claim 1 wherein the nozzles comprise a cutting mechanism arranged to cut the foamed glass exiting the nozzle into segments.

4. An apparatus according to claim 3, wherein the cutting mechanism comprises one or more nozzles jets of pressurized air directed towards the foamed glass exiting the nozzles.

5. An apparatus according to claim 1 wherein the dispensing device comprises a spiral screw connected to a shaft of the mixing device.

6. An apparatus according to claim 1 wherein the dispensing device comprises a rotating plane blade connected to the rotating mixing shaft.

7. An apparatus according to claim 1 wherein the extruder chamber comprises a cylindrical, internal heating device having a heated, conical upper surface, said conical upper surface arranged at a distance from the dispensing device such that glass mixture dispensed from the dispensing device may fall freely through a free-fall zone from the feed chamber onto the heated conical surface.

8. An apparatus according to claim 1 wherein the apparatus is encased in a heat-retaining, insulated material.

9. An apparatus according to claim 1 wherein the interior of the expansion chamber is at normal atmospheric pressure, and wherein the expansion chamber further comprises an adjustable heat source and temperature sensor arranged to control and regulate the cooling of the foamed glass.

10. An apparatus according to claim 1 further comprising a mold for receiving foamed glass material from the nozzles.

* * * * *